United States Patent
Zhang et al.

(10) Patent No.: US 8,200,823 B1
(45) Date of Patent: Jun. 12, 2012

(54) TECHNIQUE FOR DEPLOYMENT AND MANAGEMENT OF NETWORK SYSTEM MANAGEMENT SERVICES

(75) Inventors: Peinan C. Zhang, San Jose, CA (US); Eugene Krivopaltsev, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 2857 days.

(21) Appl. No.: 10/815,221

(22) Filed: Mar. 30, 2004

(51) Int. Cl.
*G06F 15/173* (2006.01)
(52) U.S. Cl. ........................................ 709/226; 709/223
(58) Field of Classification Search .................. 709/220, 709/223, 225, 226
See application file for complete search history.

(56) References Cited

U.S. PATENT DOCUMENTS

| | | | |
|---|---|---|---|
| 2002/0173984 A1 | 11/2002 | Robertson et al. | |
| 2003/0144894 A1* | 7/2003 | Robertson et al. | 705/8 |

OTHER PUBLICATIONS

Sun Microsystems, Inc., "Enterprise JavaBeans™ Specification, Version 2.1," Nov. 12, 2003, pp. 1-646 (text provided on CD-ROM).
Sun Microsystems, Inc., "Sun Management Center 3.5 User's Guide," May 2003, Part No. 816-2716-10, pp. 1-418 (text provided on CD-ROM).

* cited by examiner

*Primary Examiner* — Peling Shaw
(74) *Attorney, Agent, or Firm* — Osha • Liang LLP

(57) ABSTRACT

A network system management system comprises a set of management services for managing a set of devices through a network, and a set of service containers in which each service container is associated with management services and enforces regulations that are common among the associated management services. Each service container creates service providers that each creates a respective management service, in response to a service request, for use in managing the devices. Each service container comprises a service factory that registers services with an internal registry in association with a service provider, registers the services with an external registry in association with the service factory, and controls access by a user session to the services that are registered with the external registry, based on the pertinent service container-based regulations. The system provides for simple plug-in deployment of services into the system, and management of such services within the system.

21 Claims, 3 Drawing Sheets

TECHNIQUE FOR DEPLOYMENT AND MANAGEMENT OF NETWORK SYSTEM MANAGEMENT SERVICES

BACKGROUND

Generally, network system management software tools provide the capability of managing a system of multiple networked devices ("managed devices"). In some system management architectures, a user, such as a system administrator, accesses an agent executing on any of a number of respective managed devices through a central management server. Hence, the user manages the managed devices via the management server. The management server typically communicates with an agent on behalf of the user working from a remote client. The agents that execute on managed devices perform management operations based on commands from the server and provide detailed information to the server about respective managed devices.

The management server provides not only a path through which an administrator can monitor and manage a given managed device, but may also provide a set of management services which can execute on one or more server machines to perform a set of enterprise management functionalities across a set of machines. Such management services may require different access permissions and different runtime environments. A "server context" is a set of services that is executing on a given server machine and is associated with one or more "server ranges," where each server range is a set of agents executing on respective managed devices that are managed based on the same server context.

When new system management requirements arise, one or more new management services may need to be added to the management system. In some scenarios, a new management service is expected to be able to use and/or interact with other management services in the system, while in other scenarios, the new management service may be expected to be isolated from other management services in the system. The current approach to deployment and management of network system management services has room for improvement.

SUMMARY

Embodiments of the present invention provide an improved system management framework with mechanisms for deploying and managing management services that are associated with a network system management system.

The system management framework comprises a set of service containers, with each container being associated with ("containing") a set of management services and responsible for enforcing regulations that are common among the services. Each service container comprises a service factory that is associated with a set of service providers, with each service provider being responsible for creating instances of a respective management service, on demand. The service factory registers with registry services, both internal to the given service container and external to the service container. Each service container further comprises a session management service, to manage user sessions accessing the management services contained in the service container, and each service may provide a set of common utilities shared by all the associated service providers.

According to an embodiment, in response to a service container detecting a new management service configuration file in a particular directory, the service container instantiates a new service provider for instantiating a new management service that is configured with the new management service configuration file, and registers, with the internal registry and in association with the new service provider, the new management service. Furthermore, according to other embodiments, in response to a service container detecting removal from the particular directory of a management service configuration file that configures an associated management service, the service container informs the external registry service that the associated management service is no longer available from the service container; and the external registry service removes the associated management service from a register upon completion of use of associated management service instances by all user sessions. For example, a management service is defined and configured by a configuration file. Once new service configuration information (e.g., a configuration file) is added into the system, such as added into a particular directory, the service container will automatically detect the changes to the directory and add the associated service provider into the factory. On the other hand, once a service container detects a service configuration file has been removed from the system, the service container deregisters the associated service provider from the factory.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS

Operating Environment Example

Figure 1:
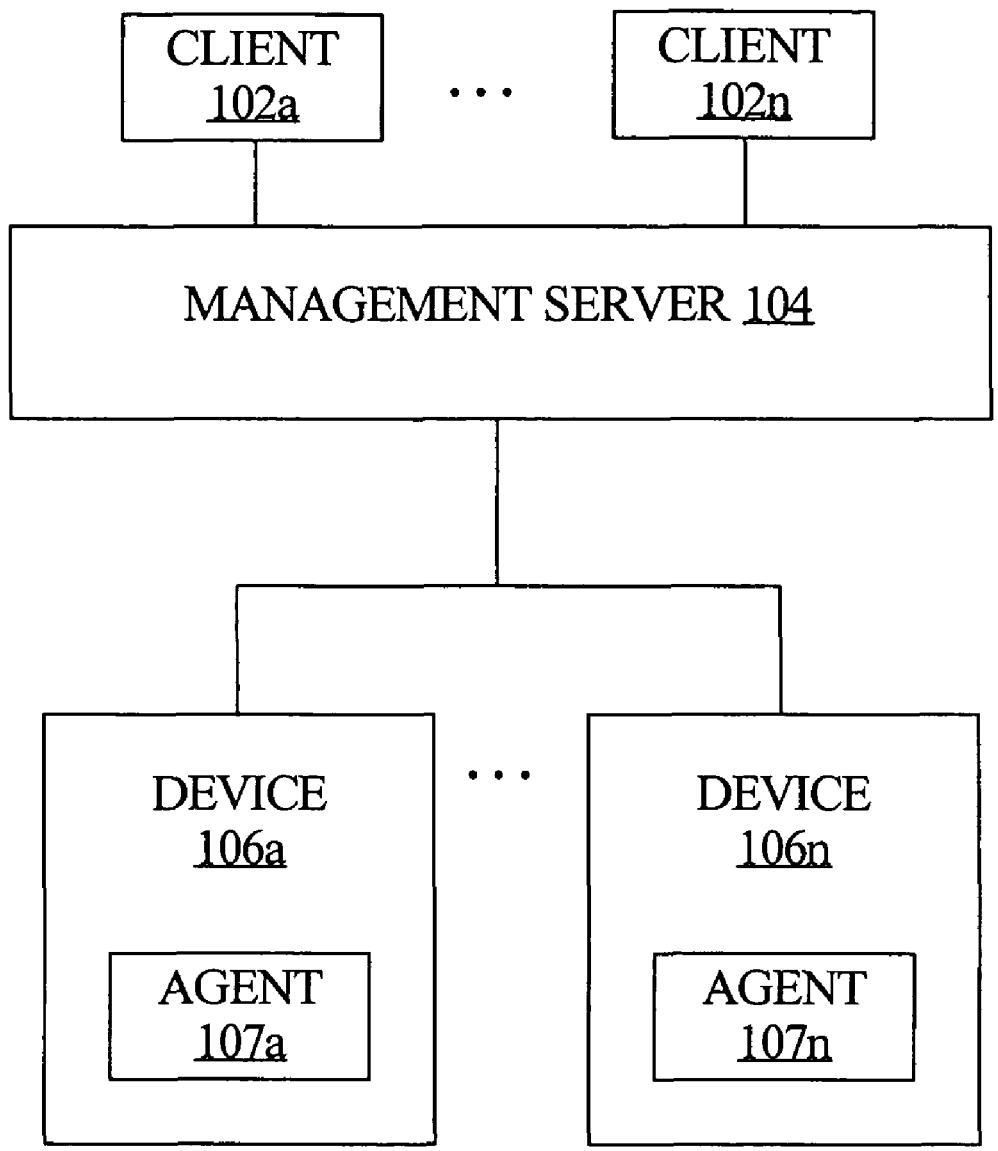
FIG. 1 is a block diagram that illustrates an example of an operating environment in which an embodiment of the invention can operate.

FIG. 1 is a block diagram that illustrates an example of an operating environment in which an embodiment of the invention can operate. Generally, the operating environment is configured according to a three-tier architecture having a presentation tier, a server tier and an agent tier. The operating environment illustrated in FIG. 1 is in the context of a network system management system. However, implementation of embodiments of the invention are not limited to the system management context.

One or more clients 102a-102n are communicatively coupled to one or more devices 106a-106n through a management server 104. Clients 102a-102n are any mechanism from which a user, such as a system administrator, can communicate with the management server 104, which is executing on one or more server machines. For example, clients 102a-102n may be conventional computer systems, such as computer system 300 of FIG. 3. A user may communicate with management server 104 using, for example, a CLI (Command Line Interface) or a GUI (Graphical User Interface) displayed on respective displays of clients 102a-102n, both of which can be used to schedule and execute management service tasks. Further, clients 102a-102n communicate with management server 104 and ultimately devices 106a-106n using a suitable communication protocol. Two clients are shown for purposes of example, and implementations may vary as to how many clients are communicatively coupled to management server 104.

Figure 3:
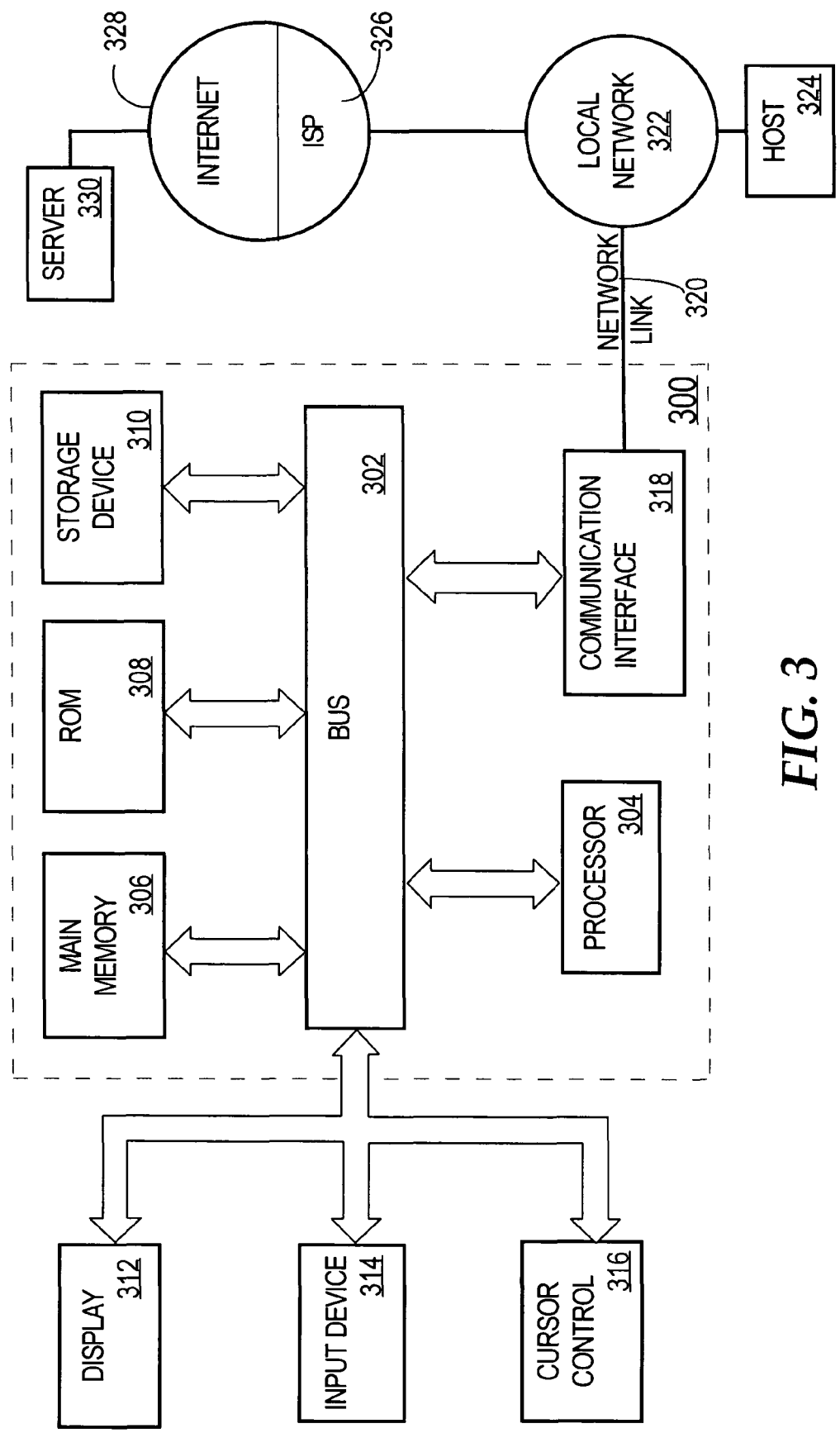
FIG. 3 shows a hardware block diagram of a computer system on which an embodiment of the invention may be implemented.

The one or more server machines on which management server 104 executes may be any conventional computing platform, such as computer system 300 (FIG. 3). Server machines execute one or more instances of a system management server 104, which each host one or more management services. The server machine(s) provide the computing platform through which managed devices 106a-106n are managed, via device agents 107a-107n. Management server 104 comprises one or more sequences of instructions, which, when executed by one or more processors, cause the processors to perform actions.

Figure 2:
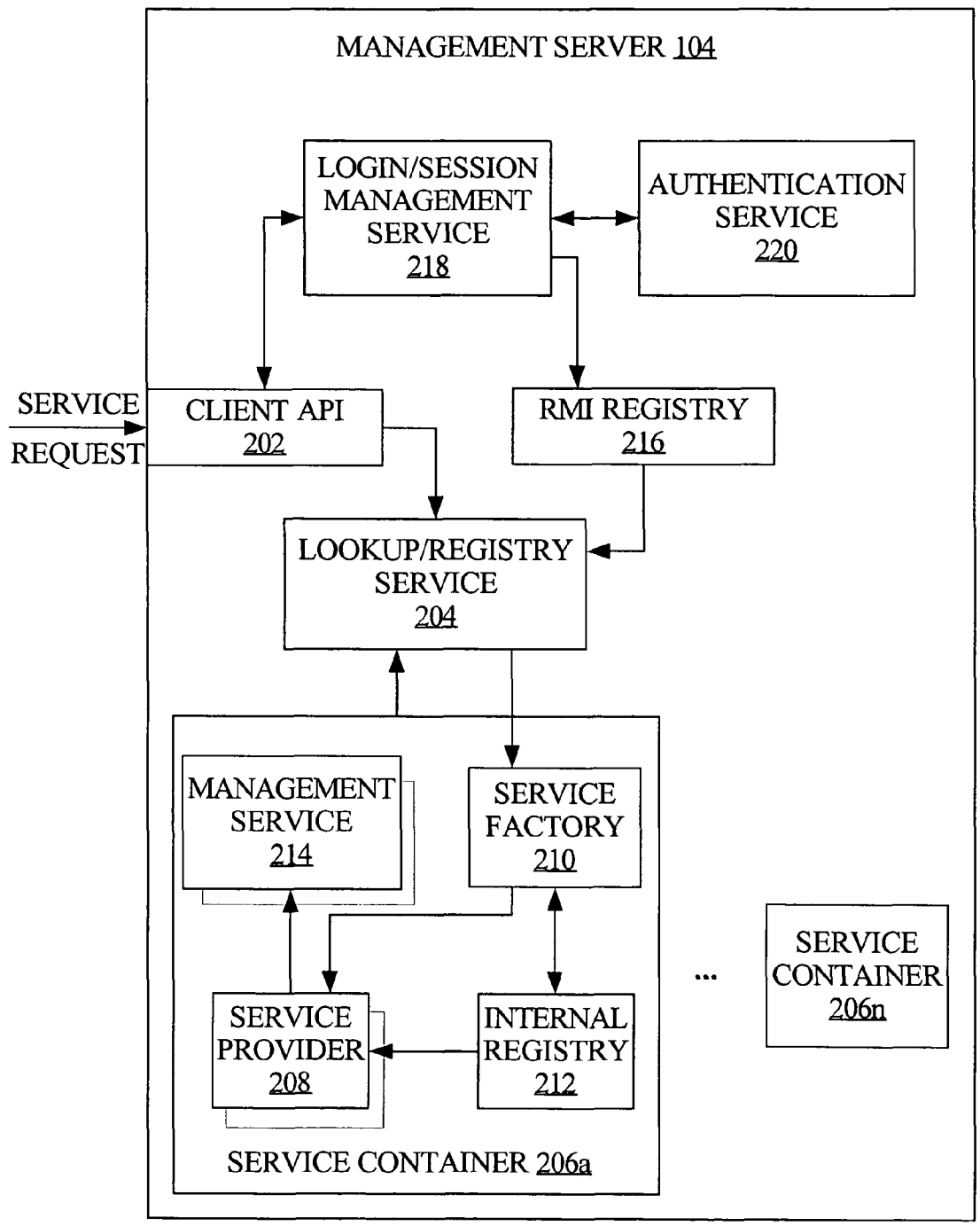
FIG. 2 is a block diagram that illustrates functional components of a network system management server and interactions therebetween, according to an embodiment of the invention.

Non-limiting examples of components within a management server 104 include a login/session management service (218 of FIG. 2), authentication service (220 of FIG. 2), lookup/registry service (204 of FIG. 2), topology service, event handler, trap handler, and the like, some of which are described in reference to FIG. 2. Management server 104 is associated with one or more "server context", which can be defined as a set of services that are executing on a given server machine. As mentioned, a server context is associated with one or more sets of agents 107a-107n executing on respective devices.

Agents 107a-107n are implemented as one or more software modules. More specifically, agents 107a-107n are one or more sequences of instructions, which, when executed by one or more processors, cause the processors to perform actions. Agents belonging to a given server context send trap information to a network interface of a server machine using any suitable communication protocol for communications between the management server 104 and agents 107a-107n, such as SNMP.

Techniques are described herein for deployment and management of system management services. Although the example operating environment is described in the context of a three-tier system architecture, embodiments are not limited to use in a three-tier system. The described techniques may be implemented for use in any context in which some type of work is compartmentalized and characterized, such as with what is referred to herein as a service.

Conceptual Overview

In accordance with one embodiment of the present invention, there is provided an improved system management framework with mechanisms for deploying and managing management services that are associated with a network system management system. A block diagram, which provides a high-level overview of some exemplary functional components of these mechanisms, is illustrated in FIG. 2 and described in reference thereto.

The system management framework comprises a set of service containers, with each container being associated with ("containing") a set of management services and responsible for enforcing regulations that are common among the services. Each service container comprises a service factory that is associated with a set of service providers, with each service provider being responsible for creating instances of a respective management service, on demand. The service factory registers with registry services, both internal to the given service container and external to the service container. Each service container further comprises a session management service, to manage user sessions accessing the management services contained in the service container, and each service may provide a set of common utilities shared by all the associated service providers.

A method that may be performed by specified actors in the improved system management framework, and which is described herein throughout in reference to the various actors, comprises the following actions: (a) creating, by a first service container that is created to manage one or more services, a registry service that is external to the set of service containers; (b) creating, by each service container from the set, one or more service providers that each creates a service for use in managing a set of network devices in response to a request for the particular service from a user session; (c) maintaining a list, by each service container, of the service providers that are associated with the respective management services contained in the service container; and (d) registering with the registry service, by each service container, the service providers that are associated with the service container.

Description of Functional Components

FIG. 2 is a block diagram that illustrates functional components of a network system management server and interactions therebetween, according to an embodiment of the invention.

Management server 104 comprises client application program interfaces (illustrated as API 202) that provide interfaces to a lookup/registry ("registry") service 204, a login/session management service 218, an authentication service 220 and one or more service containers 206a-206n. Each service container 206a-206n comprises a service factory 210, an internal registry 212, one or more service providers 208 and associated one or more management services 214. Though shown separately, the service factory 210 can be considered to subsume the service providers 214. Each of these components are described hereafter, and can be implemented as one or more sequences of instructions which, when executed, cause one or more processors to perform certain actions.

Management Service 214

As discussed, network system management functionalities, or work, can be performed by one or more management services 214. Non-limiting examples of management services include topology service, event handler service, metadata management service, configuration service, alarm management service, trouble-ticketing service, event correlation service, provisioning service, and the like. Management services may require different access permissions and different runtime environments, and may be dependent on other management services. The techniques described herein provide an improved infrastructure and improved methods for deploying and managing services, such as management service 214. Each service container 206a contains a set of one or more management services 214.

Each management service 214 is instantiated, or created, by an associated service provider 208. Generally, management services in a given server context may run in a single self-contained set of resources, or operating environment. Each server context may contain one or more service containers 206a-206n. It is desirable to have the capability to "plug-in", configure and instantiate at runtime a new management service 214 without undesirably impacting other services in the system.

Registry Service 204

The registry service 204 is used for registering service providers 208 that provide management services 214 and for "looking up" or identifying registered management services 214, by authenticated users. The registry service 204 comprises a registration component that provides the APIs to register and deregister management services 214 via registering and deregistering respective service providers 208. The registry service 204 registers management service names in association with an associated service factory 210. Consequently, the associated service factory 210 can be used, via APIs, to get a particular management service 214 by name.

The registry service 204 also provides APIs to allow authenticated users to get management services 214. A user session object is used to get the user's security credential and to maintain the resources used by this user session. Once a lookup request for a particular management service 214 is received via a user session, the registry service 204 finds the corresponding service factory 210 that is registered in association with the requested management service 214, and invokes the service factory 210 API to get an instance of the requested management service 214 from the respective service provider 208.

The registry service 204 is instantiated for each server context by whichever service container 206a-206n is first instantiated in the associated server context. Furthermore, the registry service 204 also registers itself, or is registered, in an RMI (Remote Method Invocation) registry 216 as a remote object so that the registry service 204 is exposed, through an RMI registry 216 lookup process, for use by all other management services or service containers that are associated with other server contexts. Therefore, a management service or service container executing in one operating environment can identify and use the management services that are contained in a container in a different operating environment. For example, a service container that is executing in a first runtime environment can determine what management services are executing in a second runtime environment, via an exposed common registry service 204 that allows the individual service containers 206a-206n to advertise their respective management services 214.

Service Container 206

The service containers 206a-206n in a given server context are instantiated sequentially, based on the location of associated container configuration files in a deployment directory. In an embodiment, the first container that is instantiated in a given server context is responsible for instantiating a login/session management service 218, an authentication service 220 and a registry service 204. Thus, when a service container 206a-206n is instantiated, it first attempts to find the registry service 204. If the registry service 204 is not registered with the RMI registry 216, then this particular service container is the first container instance of this server context. Therefore, this service container instantiates the basic components of the server context first, which are the login/session management service 218, the authentication service 220 and the registry service 204, and registers them to the RMI registry 216 for this server context.

After the registry service 204 is available, each service container 206a-206n can instantiate the service providers 208 via the service factory 210, and register the service providers 208 with the registry service 204. Each service container 206a maintains the service providers 208 in this service container 206a and maintains the user sessions that are using the management services 214. If registry service 204 becomes unreachable, a service container 206a-206n should re-register itself with a new instance of the registry service 204.

In one embodiment, a service container 206a-206n is configured by an XML file, which identifies all the service types that run in this container and indicates the location of the service providers 208. Furthermore, all the service containers' configuration files are installed in a pre-defined location (e.g., a deployment directory), therefore, when the management system is initialized, all the service containers 206a-206n can be instantiated automatically.

Service Provider 208

A service container 206a can include one or more service providers 208. Each service provider 208 provides the capability to instantiate, or create an instance of, a particular management service 214. The service container 206a maintains, in the internal registry 212, a list of management services 214 that the container can provide in association with the respective service providers 208 that are responsible for instantiating each respective management service 214. The service container 206a allows each service provider 208 to decide how to instantiate a management service 214, whether a given service provider 208 will generate an instance of the management service 214 per request or one instance of the management service shared by all requests, and the like.

Each service provider 208 is specified in one or more service configuration files. In one embodiment, a management service is specified in an XML file that, for example, contains the service name, version, class path, and service provider main class and name-value pairs used for initial service configuration. In one embodiment, the service configuration files are installed in a subdirectory under the deployment directory defined in the service container's configuration file. Hence, the service container construct provides service "plugability" into the overall system management system. For example, a given service container 206a may host management services 214 implemented as part of various independent products or applications and, upon installation of a new application, the new application's configuration (i.e., deployment) file is deposited in a specified location (e.g., deployment directory) so that the service container 206a can access the configuration file and direct the service providers 208 to instantiate corresponding management services 214 accordingly.

When a service container 206a-206n is instantiated, the container accesses all service configuration files in each subdirectory under the deployment directory defined in the container's configuration file. The service container instantiates an instance of each service provider 208. If a management service's configuration file contains more than one service provider 208, these providers are instantiated sequentially in the order listed in the service configuration file. Hence, any dependencies among the management services 214 that are specified by the order listed in the service configuration file, such as if one management service can be instantiated only if another management service is instantiated, are maintained by the service container.

When a user session requests a particular management service 214, the associated service provider 208 instantiates an instance of the management service 214 and the service container 206a registers the instance to the user session via the login/session management service 218, so that the instance can be released once the session is completed.

Service Factory 210

Each service container 206a-206n contains a service factory 210 which is associated with service providers 208 that are registered with the registry service 204 in association with the management services 214 contained in the given container. The service factory 210 provides functions to allow a lookup process of registry service 204 to obtain management service handles, remove user sessions and check the viability of the service factory 210.

The service factory 210 maintains an internal registry 212 that, in one embodiment, is a list of management services 214 available in the associated service container, the instances of the management services 214, and the sessions using these instances. Once a new management service 214 is registered with the internal registry 212, the service factory 210 registers the management service 214 in association with the management service's service provider 208, with the registry service 204.

Once a request for a particular management service comes in from a user session via client API 202, the registry service 204 passes the request to the corresponding service factory 210 of service container 206a. The corresponding service factory 210 to which the request is passed is determined based on the register of registry service 204. The service factory 210 accesses the internal registry 212 to determine which service provider 208 is responsible for creating instances of the requested management service, and calls an associated method on the service provider 208 to get an instance of the management service. The new instance of management service is registered in association to this user session with the login/session management service 218 and, therefore, the new instance of management service is recorded as a resource held by this user session.

Deployment and Removal of Management Services

With the management service plug-in capability provided by the framework described herein, a management service developer or application developer can focus on the functionality of a management service 214, rather than on how to make the management service 214 available and how to maintain and manage the management service 214. The plug-in capability is enabled, in part, by the service container construct, which provides the infrastructure for management service configuration, instantiation and isolation. The developer can decide how many and which service containers 206a-206n are needed to support a given application and which management services should be in a given service container, based at least in part on the regulations that are associated with each given service container class. Non-limiting examples of such service container regulations include a security (e.g., management service access control and method level access control) model, database access, logging, debugging, and the like, some of which may be implemented as utility classes.

In support of the capability to dynamically plug-in new management services and remove existing management services, each service container 206a-206n includes means for monitoring the changes that occur under the container's deployment directory structure. For example, service containers 206a-206n periodically scan the contents of an associated deployment directory. Therefore, if the deployment directory, at time $t_2$, has a particular product configuration file in it that was not in the deployment directory at time $t_1$, then a service container is able to discover the new product by the presence of its configuration file, and instantiate associated management services provided by the new product.

Once it is detected that a new subdirectory is added under the container's deployment directory, the container instantiates the new service provider 208 that corresponds with the new management service 214 specified by the new service configuration file under the subdirectory, and registers the service provider 208 with the registry service 204. Once it is detected that an existing subdirectory is removed from the container's deployment directory, the container informs the registry service 204 that the particular management service 214 specified by the removed service configuration file is no longer available from this container. The registry service 204, in turn, removes the corresponding service provider 208 when all client user sessions are finished using instances of the associated management service 214.

Management Service Access Control

Each management service 214 can only be accessed by authenticated users/groups that are associated with an authenticated session. This authentication is performed at user session set up time via the authentication service 220. In addition, management services 214 may also provide method level access control to the authenticated users/groups. Access control at the method level is defined in the same service configuration file that defines each respective management service 214. The service configuration file indicates, for each operation within a management service 214, which users and groups are allowed or denied use of such operation. For example, for one service an access control regulation may allow Create, Delete and Run operations, while for another service an access control regulation may allow Update, Format and Export operations.

Remote Access

A remote access utility service, in conjunction with RMI registry 216, allows one management service to access another management service regardless of whether the target management service is in a local server context or belongs to a remote server context. When the requested management service is in a remote server context, the remote access utility acts as a client to the remote server context through a login component of the remote server context. However, instead of using the current user's system password, the remote access utility uses the current user's security credential, which will contain the user's security key, etc., to authenticate the user.

The remote server context will create a user session and authenticate the user with its authentication service 220. Once the remote access utility, as a client, gets the secured session handle, the utility registers this remote secured session handle to the local login/session management service 218, so that this handle can be reused for later access to that server context. This utility will use this secured session handle to get a desired service handle and also registers the service handle with the login/session management service 218, when necessary. Hence, these management services can be released when the current session is completed.

Service and User Session Management

In addition to management service registration, lookup and instantiation, as previously described, another facet of service management is referred to as "aliveness checking". With aliveness checking at the management service level, the lookup functionality of registry service 204 periodically pings the service factory 210 that is associated with each service container 206a-206n of an associated server context to determine the viability of the service factory 210. If registry service 204 finds a service factory 210 not reachable after a certain number of attempts, the registry service 204 unregisters all the management services 214 from the particular service container 206a-206n that is associated with this service factory 210. Furthermore, each service factory 210 checks whether it is getting pinged periodically. If a service factory 210 is not pinged for a certain amount of time, it means that either the lookup functionality has gone down or the service factory 210 has been unregistered. In such a scenario, the service factory 210 attempts to re-register all of its associated management services 214 back to the registry service 204.

With aliveness checking at the user session level, a client user session periodically pings the login/session management service 218 to determine the viability of the service. Once the client detects that the login/session management service 218 is gone, the client can inform any relevant applications, through which session resources can be released. Furthermore, the login/session management service 218 checks whether it is getting pinged periodically by the current user sessions. If the login/session management service 218 finds a certain session did not ping the login/session management service 218 for a certain amount of time, it means that the user session is gone. Therefore, the login/session management service 218 triggers action to release all resource/services associated with this session.

When the client closes a user session by informing the login/session management service 218, or the login/session management service 218 detects that the user session is gone, the login/session management service 218 triggers release of all the resource associated with this session. The login/session management service 218 then informs the relevant service factory 210 to remove the current session information, which will in turn release the instances of management services 214 for this session.

Hardware Overview

In one embodiment, the management server 104 is implemented as a set of instructions executable by one or more processors. The invention may be implemented as part of an object oriented programming (OOP) system, and in some embodiments is implemented in a non-OOP system. In one embodiment, the Java™ programming system is utilized, whereas in another embodiment, C/C++ languages may be utilized. Furthermore, different programming languages may be used for different components, such as Java™ for the client and management server and C and Tcl for the agents. Another programming framework which may be utilized to implement the described techniques includes the .NET framework.

FIG. 3 is a block diagram that illustrates a computer system 300 upon which an embodiment of the invention may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, the techniques described herein are not limited to any specific type of system, application or runtime environment. The specification and drawings are, accordingly, to be regarded in an illustrative rather than a restrictive sense.

In addition, certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method performed by a machine implemented service container that contains one or more services, the method comprising:
    detecting, by the service container, a service configuration file defining a particular service that is to be contained by the service container, wherein the service configuration file comprises a reference to a service provider that is responsible for creating an instance of the particular service in response to a request for the particular service;
    instantiating, by the service container, the service provider, wherein the service provider is contained by the service container;
    updating, by the service container, an internal registry to include information associating the service provider with the particular service; and
    registering, by the service container, the particular service with a lookup/registry service external to the service container to indicate that the particular service is provided by the service container, thereby enabling components external to the service container to use the lookup/registry service to access the particular service provided by the service container.

2. The method of claim 1, further comprising:
    receiving, by the service container, a request for the particular service;
    accessing, by the service container, the internal registry;
    determining, by the service container, based upon the information in the internal registry, that the service provider is associated with the particular service; and
    calling, by the service container, the service provider to obtain an instance of the particular service therefrom.

3. The method of claim 2, wherein the request has a user session associated therewith, and wherein the method further comprises:
    associating, by the service container, the instance of the particular service with the user session.

4. The method of claim 3, further comprising:
    receiving, by the service container, information indicating that the user session has been closed; and
    releasing, by the service container, the instance of the particular service from the user session.

5. The method of claim 1, further comprising:
    detecting, by the service container, that the service configuration file defining the particular service has been removed; and
    deregistering, by the service container, the particular service with the lookup/registry service to indicate that the particular service is no longer available from the service container.

6. The method of claim 1, wherein the service container is one of a plurality of service containers, and wherein the method further comprises:
    instantiating, by the service container, the lookup/registry service, wherein the lookup/registry service is used by all of the service containers in the plurality of service containers.

7. The method of claim 1, wherein detecting comprises:
    monitoring, by the service container, a deployment directory associated with the service container for newly added service configuration files.

8. A machine readable storage medium comprising instructions which, when executed by one or more processors, cause the one or more processors to implement a service container that contains one or more services, the service container performing the steps of:

detecting a service configuration file defining a particular service that is to be contained by the service container, wherein the service configuration file comprises a reference to a service provider that is responsible for creating an instance of the particular service in response to a request for the particular service;

instantiating the service provider, wherein the service provider is contained by the service container;

updating an internal registry to include information associating the service provider with the particular service; and registering the particular service with a lookup/registry service external to the service container to indicate that the particular service is provided by the service container, thereby enabling components external to the service container to use the lookup/registry service to access the particular service provided by the service container.

9. The machine readable storage medium of claim 8, wherein the service container further performs the steps of:

receiving a request for the particular service;

accessing the internal registry;

determining based upon the information in the internal registry, that the service provider is associated with the particular service; and calling the service provider to obtain an instance of the particular service therefrom.

10. The machine readable storage medium of claim 9, wherein the request has a user session associated therewith, and wherein the service container further performs the step of:

associating the instance of the particular service with the user session.

11. The machine readable storage medium of claim 10, wherein the service container further performs the steps of:

receiving information indicating that the user session has been closed; and releasing the instance of the particular service from the user session.

12. The machine readable storage medium of claim 8, wherein the service container further performs the steps of:

detecting that the service configuration file defining the particular service has been removed; and deregistering the particular service with the lookup/registry service to indicate that the particular service is no longer available from the service container.

13. The machine readable storage medium of claim 8, wherein the service container is one of a plurality of service containers, and wherein the service container further performs the step of:

instantiating the lookup/registry service, wherein the lookup/registry service is used by all of the service containers in the plurality of service containers.

14. The machine readable storage medium of claim 8, wherein detecting comprises:

monitoring a deployment directory associated with the service container for newly added service configuration files.

15. An apparatus, comprising:

one or more processors; and a storage comprising instructions which, when executed by the one or more processors, cause the one or more processors to implement a service container that contains one or more services, the service container performing the steps of:

detecting a service configuration file defining a particular service that is to be contained by the service container, wherein the service configuration file comprises a reference to a service provider that is responsible for creating an instance of the particular service in response to a request for the particular service;

instantiating the service provider, wherein the service provider is contained by the service container;

updating an internal registry to include information associating the service provider with the particular service; and registering the particular service with a lookup/registry service external to the service container to indicate that the particular service is provided by the service container, thereby enabling components external to the service container to use the lookup/registry service to access the particular service provided by the service container.

16. The apparatus of claim 15, wherein the service container further performs the steps of:

receiving a request for the particular service;

accessing the internal registry;

determining based upon the information in the internal registry, that the service provider is associated with the particular service; and calling the service provider to obtain an instance of the particular service therefrom.

17. The apparatus of claim 16, wherein the request has a user session associated therewith, and wherein the service container further performs the step of:

associating the instance of the particular service with the user session.

18. The apparatus of claim 17, wherein the service container further performs the steps of:

receiving information indicating that the user session has been closed; and releasing the instance of the particular service from the user session.

19. The apparatus of claim 15, wherein the service container further performs the steps of:

detecting that the service configuration file defining the particular service has been removed; and deregistering the particular service with the lookup/registry service to indicate that the particular service is no longer available from the service container.

20. The apparatus of claim 15, wherein the service container is one of a plurality of service containers, and wherein the service container further performs the step of:

instantiating the lookup/registry service, wherein the lookup/registry service is used by all of the service containers in the plurality of service containers.

21. The apparatus of claim 15, wherein detecting comprises:

monitoring a deployment directory associated with the service container for newly added service configuration files.

\* \* \* \* \*